Patented June 20, 1933

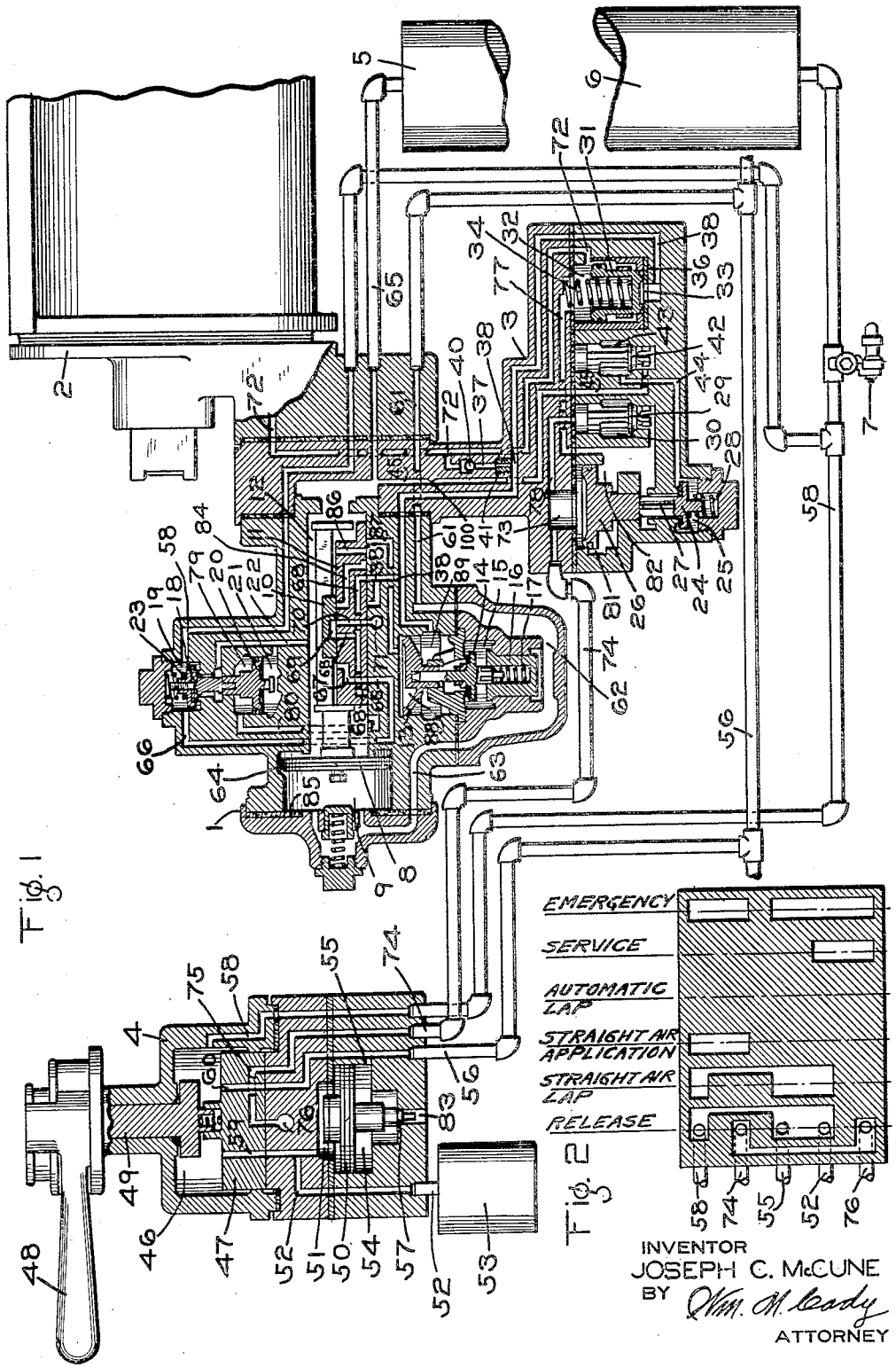

1,914,611

UNITED STATES PATENT OFFICE

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID PRESSURE BRAKE

Application filed July 31, 1930. Serial No. 471,967.

This invention relates to fluid pressure brakes and more particularly to the type in which the brakes are adapted to be controlled either automatically or by straight air.

The principal object of my invention is to provide an improved equipment of the above type having means by which an emergency application of the brakes may be obtained at a faster rate.

In brake equipments of the above type it is customary to employ what is well known as a double check valve device for isolating the automatic portion of the brake equipment while the brakes are being operated by straight air and for isolating the straight air portion of the brake equipment while the automatic portion of the brake equipment is being operated to effect a service application of the brakes. When an emergency application of the brakes is effected, however, the double check valve is adapted to permit the automatic portion of the brake equipment to operate first independently of the straight air portion and then isolate the automatic portion of the brake equipment and permit the straight air portion to operate.

In the emergency operation just described, the flow of fluid from the automatic portion of the brake equipment to the brake cylinder occurs through and is controlled by the double check valve device and the principal object of my invention is to provide means by which fluid under pressure is permitted to flow directly from the automatic portion of the brake equipment to the brake cylinder without passing through the double check valve device.

In carrying out my invention, I provide a by-pass from the automatic portion of the brake equipment to the brake cylinder and further provide a check valve and a choke in said by-pass, so that except for not controlling the rate at which fluid under pressure is supplied to the brake cylinder from the automatic portion of the brake equipment upon effecting an emergency application of the brakes, the double check valve device operates in the usual manner.

Other objects and advantages will appear in the following more detailed description of the operation of my invention.

In the accompanying drawing; Fig. 1 is a diagrammatic view, partly in section, of a fluid pressure brake equipment embodying my invention; and Fig. 2 is a development view of the connections in the various positions of the brake valve device shown in Fig. 1.

As shown in the drawing, the fluid pressure brake equipment comprises a triple valve device 1, a brake cylinder 2, a check valve device 3, a brake valve device 4, an auxiliary reservoir 5, a main reservoir 6, and a feed valve device 7.

The triple valve device is of the usual well known type comprising a casing containing a piston 8 having a chamber 9 at one side, the chamber 12 at the opposite side containing slide valves 10 and 11, which slide valves are adapted to be operated by said piston. The casing further contains the usual quick action mechanism comprising a quick action piston 13, a vent valve 14 operative by said piston and contained in a chamber 15 and a check valve 16 also contained in chamber 15, a spring 17 being interposed between the vent valve 14 and check valve 16 for urging said valves to their respective seats. The triple valve casing also contains a high pressure mechanism comprising a valve 18 contained in a chamber 19 and a piston 20 for controlling the operation of said valve and having a chamber 21 at one side which is connected to the slide valve chamber 12 through a passage 22. A spring 23 is provided in chamber 19 for urging the valve 18 to its seat.

The check valve device 3 comprises a valve portion carried by a bracket portion which is adapted to be mounted between the brake cylinder 2 and triple valve device 1. The valve portion of the check valve device comprises a valve 24 contained in a chamber 25 and a piston 26 having a stem adapted to engage the fluted stem 27 of valve 24 for controlling the operation of said valve. A spring 28 is provided in chamber 25 for urging the valve 24 to its seat. The check valve device further comprises a check valve 29 contained in a chamber 30, a check valve 42 contained in a chamber 43, and a double seated valve piston 31 having a chamber 32 at one side and a chamber 33 at the opposite side. A spring 34 is provided in chamber 32 for urging said valve piston to its lower position into engagement with a seal 36, as shown in the drawing.

According to my invention I have provided a passage 37 in the check valve bracket portion, which passage is adapted to connect the triple valve brake cylinder passage 38 to the brake cylinder passage 72 and in said passage dispose a check valve 40 for preventing flow of fluid under pressure from passage 72 to passage 38, and a choke plug 41 for controlling the rate of flow of fluid under pressure in the reverse direction.

The brake valve device 4 comprises a casing having a chamber 46 containing a rotary valve 47 adapted to be operated by a handle 48 through the medium of a stem 49, the lower end of which is in operating engagement with said rotary valve. The casing also contains the usual equalizing discharge valve mechanism comprising a piston 50 having at one side a chamber 51 connected through passage and pipe 52 to an equalizing reservoir 53 and having at the opposite side a chamber 54 connected by passage 55 to a brake pipe 56 and containing a brake pipe discharge valve 57 adapted to be operated by said piston.

In operation, fluid under pressure is supplied to the main reservoir 6 in the usual manner and flows therefrom to the feed valve device 7, which reduces the pressure from that carried in said main reservoir to that employed in controlling the brakes. Fluid at reduced pressure is thus supplied by said feed valve device to a control pipe 58 through which it flows to the high pressure valve chamber 19 in the triple valve device 1 and to the rotary valve chamber 46 in the brake valve device 4.

With the brake valve device 4 in the usual release position, as shown in the drawing, fluid at feed valve pressure flows from rotary valve chamber 46 through port 59 in the rotary valve and passage 52 to the equalizing piston chamber 51 and equalizing reservoir 53. At the same time, fluid under pressure flows from said rotary valve chamber through port 60 in the rotary valve and passage 55 to the equalizing piston chamber 54 and to the brake pipe 56. The chambers at the opposite sides of the equalizing piston 50 thus become charged with fluid under pressure at substantially the same time and to the same degree, and the discharge valve 57 is maintained seated in the usual well known manner.

Fluid under pressure supplied to brake pipe 56 flows therefrom through passage 61 in the triple valve device to chamber 62 and from thence through passage 63 to piston chamber 9. The pressure of fluid in piston chamber 9 shifts the piston 8 and slide valves 10 and 11 to release position as shown in the drawing, in which position a feed groove 64 is uncovered by the piston 8 and permits fluid under pressure to flow to the valve chamber 12 and from thence through passage and pipe 65 to the auxiliary reservoir 5. Fluid at feed valve pressure also flows from the high pressure valve chamber 19 through passage 66 and port 67 in the main slide valve 11 to the valve chamber 12 in order to hasten the charging of said chamber and the auxiliary reservoir. In this manner, the brake pipe and auxiliary reservoir are charged with fluid at the pressure supplied by the feed valve device 7.

With the triple valve device 1 in release position, chamber 33 at the lower side of the double seated valve piston 31 is open to the atmosphere through passage 38, port 68 in the main slide valve 11, cavity 69 in the slide valve 10, port 70 in the slide valve 11 and the atmospheric port 71. The spring 34 is thus permitted to maintain the double seated valve piston 31 in its lower position, as shown in the drawing, in which position the chamber 32 at the opposite side of said valve piston is in communication with the brake cylinder 2 through passage 72. When the brake valve device 4 is in release position, the straight air piston chamber 73 is connected to the atmosphere through pipe and passage 74, cavity 75 in the rotary valve 47 of the brake valve device 4 and atmospheric port 76. The pressure of spring 28 is thus permitted to seat valve 24 and hold the piston 26 in the position shown in the drawing, and since chamber 32 at the upper side of the valve piston 31 is connected to the straight air piston chamber 73 through passage 77, past the check valve 29 to chamber 30 and through passage 78, the brake cylinder 2 is opened to the atmosphere and therefore normally at atmospheric pressure.

Fluid under pressure flows from the triple valve chamber 12 through passage 45, past check valve 42 to chamber 43 and through passage 44 to valve chamber 25 thus charging said chamber.

The chamber 21 at the lower side of the high pressure valve piston 20 being connected to the triple valve chamber 12 through passage 22 becomes charged with fluid at auxiliary reservoir pressure, and chamber 79 at the opposite side of said piston also is charged with fluid at auxiliary reservoir pressure through passage 80, which passage connects to valve chamber 12 through the seat of the slide valve 11. The opposing pressures acting on the piston 20 being thus equal permit spring 23 to hold the valve 18 seated If it is desired to effect a straight air application of the brakes, the brake valve device is moved to straight air application position in which the equalizing reservoir passage 52 and brake pipe passage 55 are lapped by the rotary valve 47 so as to cut off the supply of fluid under pressure to the equalizing reservoir and to the brake pipe. At the same time, the straight air passage 74 is connected to the valve chamber 46 through a port (not shown) in the rotary valve 47 and fluid at the pressure supplied by the feed valve device 7 to the rotary valve chamber 46 is permitted to flow through the straight air pipe 74 to piston chamber 73 in the check valve device 3.

The straight air piston 26 is moved downwardly by the pressure of fluid in chamber 73 and uncovers a by-pass groove 81, which permits fluid under pressure to flow from chamber 73 to chamber 82 at the lower side of said piston. Fluid under pressure thus supplied to chamber 82 flows through passage 77, chamber 32 at the upper side of the valve piston 31, which is maintained in its lower position by spring 34, and through passage 72 to the brake cylinder 2 and applies the brakes.

The downward movement of the straight air piston 26 unseats the valve 24 and permits fluid under pressure to also flow from the auxiliary reservoir 5 to the brake cylinder 2 by way of pipe 65, valve chamber 12, passage 45, past the check valve 42, through chamber 43, passage 44, valve chamber 25, past the valve 24 and through chamber 82. This causes a reduction in pressure in valve chamber 12 on the right hand side of the triple valve piston 8, so that a reduction in pressure in piston chamber 9, as may be caused by leakage of fluid under pressure from the brake pipe 58, will not cause the triple valve piston 8 and slide valves 10 and 11 to be moved from release position, as shown in the drawing, to application position as will be hereinafter described. The rate of flow from the auxiliary reservoir to the brake cylinder by way of the unseated valve 24 is restricted however, by a choked portion 100 in the passage 45, so as to limit the degree of reduction in auxiliary reservoir pressure to approximately that which may occur in the brake pipe.

When a straight air application of the brakes is effected, fluid under pressure supplied to passage 72 and from thence to the brake cylinder 2 is prevented from flowing back through passage 37 to passage 38 by ball check valve 40. This is necessary, since passage 38 is open to the atmosphere with the triple valve device 1 in release position, and would thus prevent the brakes from being applied by straight air, if the check valve 40 were not employed.

To release after a straight air application of the brakes, the brake valve device is moved to release position in which the straight air pipe 74 is connected with the atmosphere through a cavity 75 in the rotary valve 47 and the atmospheric port 76. Since the brake cylinder 2 is connected to the straight air pipe 74 by way of passage 72, chamber 32 at the upper side of the valve piston 31, passage 77, past the check valve 29, through chamber 30, passage 78 and chamber 73, fluid under pressure is vented from the brake cylinder 2 and permits the brakes to release.

To effect an automatic application of the brakes, the brake valve is turned to service position in which the straight air pipe passage 74 and the brake pipe passage 55 are lapped by the rotary valve 47. The supply of fluid under pressure to the brake pipe is thus cut off. The equalizing reservoir passage 52 is connected to the atmospheric port 76 which permits the pressure of fluid in the equalizing piston chamber 51 and equalizing reservoir 53 to reduce. As the pressure in the equalizing piston chamber 51 is thus reduced, the pressure of fluid in chamber 54 shifts the equalizing piston 50 upwardly, which unseats the brake pipe discharge valve 57 and permits fluid under pressure to flow from the brake pipe 56 to the atmosphere through the atmospheric port 83 and thus reduce the brake pipe pressure.

The triple valve piston chamber 9 being connected to the brake pipe 56, the pressure therein reduces with the reduction in brake pipe pressure and permits the fluid at auxiliary reservoir pressure in valve chamber 12 to shift the piston 8 and slide valves 10 and 11 to service position.

In service position of the triple valve slide valves, the slide valve 10 uncovers the service port 84 in the slide valve 11 and the port 84 registers with the brake cylinder passage 38. This permits fluid under pressure to flow from the auxiliary reservoir 5 to the brake cylinder 2 by way of pipe 65, valve chamber 12, service port 84, passage 38, through choke plug 41, past the check valve 40 and through pipe 72 and apply the brakes. The pressure of fluid thus supplied through passage 38 to the brake cylinder also acts on the lower side of the valve piston 31, causing said valve piston to be moved upwardly into engagement with its upper seat, in which position fluid under pressure is also permitted to flow from passage 38 to passage 72 leading to the brake cylinder.

The flow of fluid under pressure from the triple valve passage 38 to the brake cylinder passage 72 thus occurs through passage 37, as well as past the valve piston 31. This is merely incidental, since the rate of flow in effecting a service application of the brakes is controlled by the triple valve device, and consequently the passage 37 is of no value in so far as a service application of the brakes is concerned, but said passage is important in effecting an emergency application of the brakes for the reason that it permits an increase in the rate of flow of fluid under pressure from the triple valve device to the brake cylinder, as will be hereinafter described.

In order to release after an automatic application of the brakes, the brake valve device 4 is turned to release position in which fluid under pressure is supplied to the brake pipe 56 and triple valve piston chamber 9 in the same manner as in initially charging the brake equipment. When the pressure in the piston chamber 9 is thus built up to a degree slightly exceeding the reduced pressure in valve chamber 12, the triple valve piston 8 shifts the slide valves 10 and 11 to release position. The auxiliary reservoir 5 is then recharged with fluid under pressure from the brake pipe 56 and the high pressure valve chamber 19 in the same manner as in initially charging the brake equipment.

In release position of the triple valve device, the brake cylinder 2 is opened to the atmosphere through passage 72, past the valve piston 31, which is seated in its upper position through chamber 33, passage 38, port 68 in the main slide valve 11, cavity 69 in the slide valve 10, port 70 in the slide valve 11 and atmospheric port 71, which permits fluid under pressure to be vented from the brake cylinder. When the brake cylinder pressure is thus reduced to some predetermined low degree, the pressure of spring 34 shifts the valve piston 31 to its lower position, as shown in the drawing, in which position the remaining fluid under pressure in the brake cylinder 2 is vented to the atmosphere through passage 72, chamber 32, passage 77, past check valve 29, through passage 78, chamber 73 and the straight air pipe 74, in the same manner as when releasing after a straight air application of the brakes.

To effect an emergency application of the brakes, the brake valve is turned to emergency position in which the brake pipe passage 55 is connected directly to the atmospheric port 76 and the straight air pipe 74 is connected to the rotary valve chamber 46.

With the brake pipe thus open to the atmosphere, fluid under pressure is suddenly vented therefrom and also from the connected triple valve piston chamber 9. The sudden reduction in pressure in the triple valve piston chamber permits auxiliary reservoir pressure in slide valve chamber 12 to shift the piston 8 and slide valves 10 and 11 to emergency position, in which position the piston 8 engages a gasket 85.

In emergency position, port 87 is uncovered by the main slide valve 11 and fluid under pressure flows from valve chamber 12 through said port to the quick action piston chamber 88. The quick action piston 13 is thereby moved downwardly and unseats the vent valve 14, which permits fluid at brake pipe pressure in chamber 62 to lift the check valve 16 and flow into chamber 15 and from thence past the unseated vent valve 14, through chamber 89, passage 38, choke plug 41, passage 37, past ball check valve 40 and through passage 72 to the brake cylinder 2. This permits a sudden local reduction to occur in brake pipe pressure, which reduction is adapted to aid in transmitting the emergency action through a train.

At substantially the same time as the quick action mechanism operates, chamber 79 at the upper side of the high pressure valve piston 20 is connected to the brake cylinder passage 38 through passage 80 and port 68 in the slide valve. At this time only a slight pressure has been built up in the brake cylinder, so that fluid under pressure is vented from the chamber 79, which permits the pressure of fluid in chamber 21 to shift said piston upwardly and unseat the check valve 18. This permits fluid at the pressure supplied by feed valve device 7 to check valve chamber 19 to flow past the check valve 18 and through passage 22 to valve chamber 12.

In emergency position of the triple valve, fluid under pressure supplied from the auxiliary reservoir and feed valve device 7 to valve chamber 12 is permitted to flow to the brake cylinder through the emergency port 86 in the slide valve 11, passage 38, choke plug 41, passage 37, past check valve 40, and through passage 72. In this manner the application of brakes is initiated, the rate of application being governed by the flow area of choke plug 41.

As hereinbefore described, chamber 89 at the lower side of the quick action piston 13 and chamber 79 at the upper side of the high pressure piston 20 are both connected to the brake cylinder passage 38. When the pressure in passage 38 and said chambers becomes built up, by flow of fluid under pressure through the emergency port 86 to passage 38, substantially equal to the pressure acting on the opposite sides on said pistons, the pressure of spring 17 shifts the vent valve 14 to its seated position, which permits the check valve 16 to seat, and the pressure or spring 23 shifts the check valve 18 into engagement with its seat so as to cut off the supply of fluid under pressure from the feed valve device 7 to the slide valve chamber 12.

When the brake valve device is turned to emergency position, the straight air pipe 74 is connected to the rotary valve chamber 46, which permits fluid at the pressure supplied by the feed valve device 7 through the control pipe 58 to said valve chamber to flow through said straight air pipe to chamber 73 in the check valve device 3. The piston 26 is thereby operated to uncover by-pass groove 81 and unseat check valve 24 which permits fluid under pressure to flow to chamber 82 from the brake valve device as well as from the auxiliary reservoir in the same manner as when a straight air application of the brakes is effected.

Chamber 33 at the lower side of the valve piston 31 being connected to the passage 38, pressure supplied by the triple valve device to said passage builds up therein at the same time as in the brake cylinder 2 and shifts said piston to its upper position in which fluid under pressure is permitted to flow from passage 38 through passage 72 to the brake cylinder 2 at the same time as through choke plug 41 and passage 37. The valve piston is held in its upper position only momentarily, however, since fluid under pressure supplied through the straight air pipe 74 to chamber 82 flows through passage 77 and builds up in chamber 32 at the opposite side of said valve piston. When the pressure of fluid in chamber 32 builds up to a degree substantially equal to the pressure in chamber 33, spring 34 shifts said valve piston to its lower seat and permits fluid at the pressure supplied by the feed valve device 7 to flow directly through the valve piston chamber 32 to passage 72 leading to the brake cylinder. The brake cylinder pressure thus builds up substantially equal to the adjustment of the feed valve device 7 and when such a pressure is obtained, the pressure of spring 28 seats the check valve 24 and shifts the piston 26 back to its normal position as shown in the drawing.

It will be noted that when an emergency application of the brakes is effected, the triple valve device is first operated to supply fluid under pressure to the brake cylinder 2 to initiate the application of brakes, but the degree of brake cylinder pressure obtained thereby is limited to substantial equalization of pressures in the auxiliary reservoir and brake cylinder, which is augmented to a certain degree by the limited supply of fluid under pressure through the operation of the high pressure valve mechanism. However, the brake cylinder pressure is built up to a still higher degree by the straight air supply of fluid under pressure directly from the feed valve device 7. In order to prevent back flow from the brake cylinder to the auxiliary reservoir when the brake cylinder pressure becomes built up to a higher degree, the check valve 40 is provided to prevent flow from the brake cylinder passage 72 to the triple valve brake cylinder passage 38, which in emergency position is connected through port 86 in the main slide valve 11 to the valve chamber 12. Likewise, the check valve 42 is provided between passage 44 and passage 45, which is connected to the auxiliary reservoir 5 by way of the valve chamber 12, to prevent flow of fluid at high pressure from the chamber 82 to the auxiliary reservoir when the valve 24 is held unseated by the piston 26.

To release after an emergency application of the brakes, the brake valve device is moved to release position in which fluid under pressure is supplied from the rotary valve chamber 46 to the brake pipe 56 through port 60 in the rotary valve, and the straight air pipe 74 is connected to the atmosphere through port 75 in the rotary valve and atmospheric port 76. The brake cylinder 2 being connected to the straight air pipe through passage 72, chamber 32 at the upper side of the valve piston 31, passage 77, chamber 82 at the lower side of piston 82, past check valve 29, through passage 78 and chamber 73, fluid under pressure is vented from the brake cylinder to the atmosphere and starts the release of the brakes.

Fluid under pressure supplied to the brake pipe 56 through the brake valve device flows to the piston chamber 9 of the triple valve device and builds up a pressure in said chamber. The brake pipe pressure in piston chamber 9 has to build up sufficiently to overbalance the reduced pressure of fluid in the valve chamber 12 in order to move the triple valve parts to release position and during this time the triple valve remains in emergency position. When the brake cylinder pressure becomes reduced through the straight air pipe 74 to a degree less than the reduced auxiliary reservoir pressure, fluid under pressure starts flowing from the auxiliary reservoir through the emergency port 86, passage 38, choke plug 41, passage 37 and past the check valve 40 to the brake cylinder passage 72, which tends to maintain the brake cylinder pressure against the flow to the atmosphere through the straight air pipe. The choke plug 41 is of such a size as to permit the desired emergency rate of build up of brake cylinder pressure as hereinbefore described, but to so restrict the flow to the brake cylinder passage 72 in releasing after an emergency application as to permit the brake cylinder pressure to continue to reduce through the straight air pipe.

When the brake cylinder pressure is thus reduced to a predetermined pressure, the pressure of fluid from the auxiliary reservoir acting in chamber 33 below the valve piston 31 shifts said valve piston to its upper position against the pressure of spring 34, and in this position passage 38, which is in communication with the auxiliary reservoir through the emergency port 86 in the slide valve 11 and valve chamber 12, is connected to the brake cylinder passage 72, which permits fluid under pressure to flow from the auxiliary reservoir to the reduced pressure in the brake cylinder and effect a reduction in the pressure in valve chamber 12, so as to require a less increase of brake pipe pressure in piston chamber 9 to shift the triple valve piston 8 and slide valves 10 and 11 to release position.

When the triple valve moves to release position, the auxiliary reservoir 5 is charged with fluid under pressure in the same manner as hereinbefore described and passage 38 is connected to the atmosphere through port 68 in the slide valve 11, cavity 69 in the slide valve 10, port 70 in the slide valve 11 and atmospheric port 71. Since the brake cylinder 2 is connected to passage 38 through passage 72 and chamber 33, fluid under pressure is vented from the brake cylinder 2 through the triple valve exhaust port 77 until the pressure in chamber 33 becomes reduced to a degree to permit spring 34 to shift the valve piston 31 to its lower seated position after which the final exhaust of fluid under pressure takes place through the straight air pipe 74 by way of passage 72, chamber 32, passage 77, chamber 82, past check valve 29, through passage 78, chamber 73 and the straight air pipe 74.

From the foregoing description of operation, it will be noted that the passage 37 provides a by-pass around the valve piston 31 through which fluid under pressure is supplied to the brake cylinder 2, independently of the check valve device 3, so as to provide for an additional flow of fluid to the brake cylinder when the triple valve device is operated to effect an emergency application of the brakes. A ball check valve 40 is provided in the by-pass passage 37 to prevent flow of fluid from the brake cylinder to the atmosphere when a straight air application of the brakes is effected with the triple valve device in release position.

In effecting an emergency application of the brakes, the triple valve device first operates to supply fluid under pressure from the auxiliary reservoir 5 and feed valve pipe 58 to the brake cylinder 2, after which, the brake cylinder pressure is increased to the pressure supplied by the feed valve device 7 by the straight air operation. The pressure supplied by the feed valve device to the brake cylinder is higher than the pressure in the auxiliary reservoir after fluid under pressure is supplied from the auxiliary reservoir to the brake cylinder and the check valve 40 is adapted in emergency operation to prevent flow of fluid from the brake cylinder to the auxiliary reservoir. The check valve 42 is also adapted, in effecting an emergency application of the brakes, to prevent fluid at feed valve pressure from flowing from chamber 82 to the auxiliary reservoir.

When an emergency application of the brakes is effected, the auxiliary reservoir pressure is thus prevented from building up with brake cylinder pressure. By thus isolating the auxiliary reservoir from the brake cylinder, the volume to which fluid under pressure is supplied by straight air operation is limited to that of the brake cylinder only, and as a result, the emergency build up of brake cylinder pressure is faster than if the auxiliary reservoir pressure were permitted to build up with brake cylinder pressure.

Another desirable result of holding the auxiliary reservoir pressure below the pressure obtained in the brake cylinder in effecting an emergency application of the brakes, is that it hastens the release of brakes after an emergency application, as will now be explained.

In releasing the brakes after an emergency application, fluid under pressure is initially vented from the brake cylinder through the straight air pipe 74 to the atmosphere, and during this operation the triple valve device may still be in emergency position. Hence, when the brake cylinder pressure is reduced to below the pressure in the auxiliary reservoir, fluid under pressure from the auxiliary reservoir flows through the triple valve device and past the check valve 40 to the brake cylinder passage 72 and from thence to the atmosphere with fluid under pressure from the brake cylinder. If the auxiliary reservoir has been charged to brake cylinder pressure in effecting an emergency application of the brakes, then immediately upon initiating the release of fluid under pressure from the brake cylinder, fluid under pressure would have to be vented from the auxiliary reservoir, as well as from the brake cylinder. This would increase the volume of fluid having to be vented to effect a release of brakes and as a result, the time required to obtain a release would be increased by a time sufficient to reduce the auxiliary reservoir pressure.

The choke 41 is placed in passage 37 to restrict the flow of fluid from the auxiliary reservoir through passage 38 to the brake cylinder passage 72 to such an extent that when the brake cylinder pressure becomes reduced a predetermined degree below the auxiliary reservoir pressure, the auxiliary reservoir pressure acting in chamber 33 on the valve piston 31 will move said valve piston to its upper seat against the reduced brake cylinder pressure in chamber 32 and the pressure of spring 34. In this position, the auxiliary reservoir is connected through passage 38 to the brake cylinder passage 72, as well as past the check valve 40, which permits an increased rate of flow of fluid under pressure from the auxiliary reservoir to the brake cylinder, and a consequent reduction in pressure in the triple valve chamber 12. This is desirable, in that it reduces the pressure in the triple valve chamber 12 to a degree where a lower brake pipe pressure will move the triple valve device to release position than if the auxiliary reservoir pressure had not been reduced and the brake pipe pressure had to be increased above the higher auxiliary reservoir pressure to obtain a release. When the triple valve is thus moved to release position, communication is established from the brake cylinder through the triple valve device to the atmosphere, thereby permitting the release of brakes to continue, however, when the brake cylinder pressure is thus reduced through the triple valve device to slightly less than the pressure of spring 34 acting on the valve piston 31, said valve piston is moved to its lower seat in which the final exhaust of fluid from the brake cylinder occurs through the straight air pipe 74 and brake valve device 4.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake cylinder and a brake pipe, of a triple valve device operative upon a reduction in brake pipe pressure to supply fluid under pressure to said brake cylinder through two separate passages and upon an increase in brake pipe pressure to release fluid under pressure from said brake cylinder through one of said passages, a check valve in the other of said passages to prevent back flow from said brake cylinder, and valve means for controlling communication through the other of said passages and operative by the pressure of fluid supplied to said brake cylinder.

2. In a fluid pressure brake, the combination with a brake cylinder and a brake pipe, of a triple valve device operative upon a reduction in brake pipe pressure to supply fluid under pressure to said brake cylinder through two separate passages and upon an increase in brake pipe pressure to release fluid under pressure from said brake cylinder through one of said passages, a choke plug in the other of said passages for controlling the rate of flow of fluid to said brake cylinder, a check valve for preventing back flow through said choke plug, and valve means for controlling the supply and release of fluid to and from the brake cylinder through the first mentioned passage.

3. In a fluid pressure brake, the combination with a brake cylinder, of a brake valve device and a triple valve device each operative independently of the other to supply fluid under pressure to said brake cylinder, valve means for controlling the communication through which fluid under pressure is supplied from said valve devices to said brake cylinder and operative by the pressure of fluid supplied by said triple valve device to close communication from said brake valve device to said brake cylinder, a by-pass around said valve means through which fluid is adapted to be supplied from said triple valve device to said brake cylinder independently of said valve means, and a check valve in said by-pass.

4. In a fluid pressure brake, the combination with a brake cylinder, of a brake valve device and a triple valve device each operative independently of the other to supply fluid under pressure to said brake cylinder, and to release fluid under pressure from said brake cylinder, valve means for controlling communication through which fluid under pressure is supplied to and released from said brake cylinder upon operation of said valve devices, said valve means being operative by fluid under pressure supplied by the triple valve device to close communication from the brake valve device to the brake cylinder and to open communication through which fluid under pressure is supplied to and released from the brake cylinder by the operation of said triple valve device, means for operating said valve means upon a predetermined reduction in brake cylinder pressure effected by the operation of said triple valve device to close communication from said brake cylinder to said triple valve device and to open communication from said brake cylinder to said brake valve device, a restricted by-pass around said valve means through which fluid under pressure is adapted to be supplied from said triple valve device to said brake cylinder independently of said valve means, and a check valve in said by-pass for preventing back flow of fluid.

In testimony whereof I have hereunto set my hand, this 29th day of July, 1930.

JOSEPH C. McCUNE.